United States Patent [19]
Klumps et al.

[11] Patent Number: 5,777,260
[45] Date of Patent: Jul. 7, 1998

[54] COAXIAL CABLE ADDITIONALLY HAVING AT LEAST ONE LIGHT WAVEGUIDE

[75] Inventors: Karl-Heinz Klumps, Saterland; Hermann Goessling, Boesel; Franz-Josef Wichmann, Friesoythe; Lothar Finzel, Unterschleissheim, all of Germany

[73] Assignee: Siemens Aktiengesellschaft, Munich, Germany

[21] Appl. No.: 609,801

[22] Filed: Mar. 1, 1996

[30] Foreign Application Priority Data

Mar. 14, 1995 [DE] Germany ............... 19 509 125.6
Mar. 23, 1995 [DE] Germany ............... 19 510 548.6

[51] Int. Cl.⁶ .................. H02G 3/00; G02B 6/44
[52] U.S. Cl. ................................ 174/24; 385/105
[58] Field of Search ..................... 174/23 R, 24, 174/14 R, 25 G, 27, 28, 88 R; 385/105, 110, 112, 114

[56] References Cited

U.S. PATENT DOCUMENTS

| 2,913,514 | 11/1959 | Short | 174/90 X |
|---|---|---|---|
| 4,118,594 | 10/1978 | Arnaud | 385/105 |
| 4,199,224 | 4/1980 | Oestreich | 350/96.23 |
| 4,361,381 | 11/1982 | Williams | 385/105 |
| 4,831,215 | 5/1989 | Clark et al. | 174/92 X |
| 5,042,904 | 8/1991 | Story et al. | 385/105 |
| 5,095,176 | 3/1992 | Harbrecht et al. | 174/23 R |
| 5,188,883 | 2/1993 | Rawlyk | 428/189 X |
| 5,193,134 | 3/1993 | Pizzorno et al. | 385/105 |
| 5,210,813 | 5/1993 | Oestreich et al. | 385/105 |
| 5,249,249 | 9/1993 | Eoll et al. | 385/114 |
| 5,371,823 | 12/1994 | Barrett et la. | 385/101 X |

FOREIGN PATENT DOCUMENTS 2 710 098  9/1978  Germany.

Primary Examiner—Kristine L. Kincaid
Assistant Examiner—Chau N. Nguyen
Attorney, Agent, or Firm—Hill & Simpson

[57] ABSTRACT

An intermediate layer in which at least one channel-like depression is provided on the outer conductor of a coaxial cable. The depression proceeds helically with respect to the cable axis and at least one light waveguide is arranged in it. An outside envelope is applied outside the intermediate layer.

19 Claims, 3 Drawing Sheets

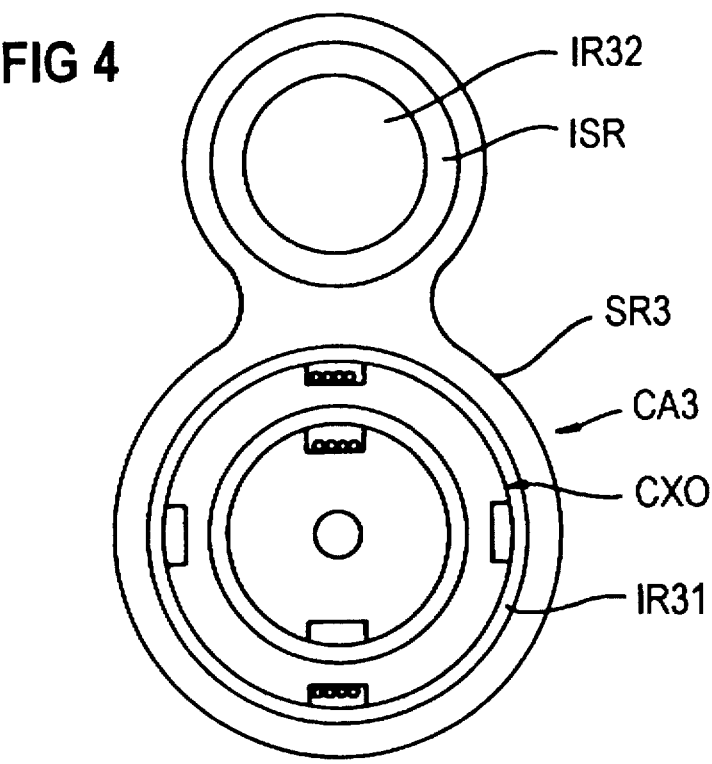
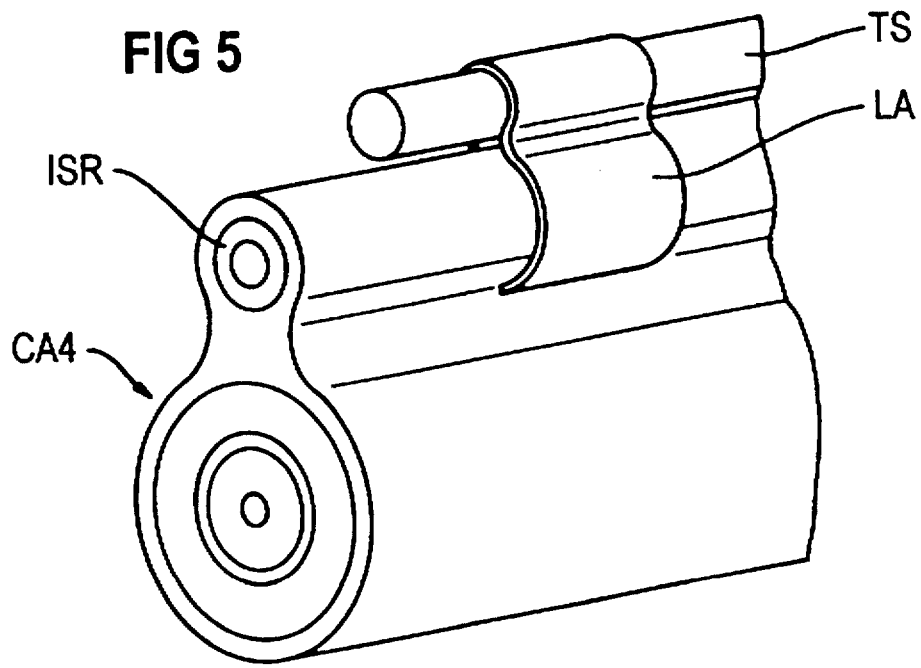

COAXIAL CABLE ADDITIONALLY HAVING AT LEAST ONE LIGHT WAVEGUIDE

BACKGROUND OF THE INVENTION

The invention is directed to a coaxial cable having an inner conductor and an outer conductor surrounding the inner conductor, as well as additionally having at least one light waveguide.

Such a structure, however, is accompanied by considerable limitations with respect to the design possibilities because form and dimensions of the dielectric or of the inner conductor are prescribed by the electrical properties of the coaxial cable.

SUMMARY OF THE INVENTION

An object of the invention is to create a coaxial cable wherein the arrangement of the light waveguides is possible without taking the electrical characteristics of the coaxial cable into account. In a coaxial cable of the type initially cited, this object is achieved in that an intermediate layer is provided on the outer conductor of the coaxial cable. A channel-shaped depression is provided in this intermediate layer, the depression proceeding helically with reference to the cable axis. At least one light waveguide is arranged in this channel-shaped depression. An outside envelope is applied outside the intermediate layer.

The intermediate layer lies outside the outer conductor and can thus be freely selected with respect to type, structure and composition and does not enter into the electrical properties of the coaxial cable. Many design possibilities thus result due to the invention, and the structure can be selected in a largely arbitrary way without negatively influencing the behavior of the coaxial cable.

BRIEF DESCRIPTION OF THE DRAWINGS

FIG. 4 is a front view of a figure-8 cable; and

FIG. 5 shows the design of a figure-8 cable within the framework of the invention, shown in a perspective view.

DESCRIPTION OF THE PREFERRED EMBODIMENTS

Figure 1:
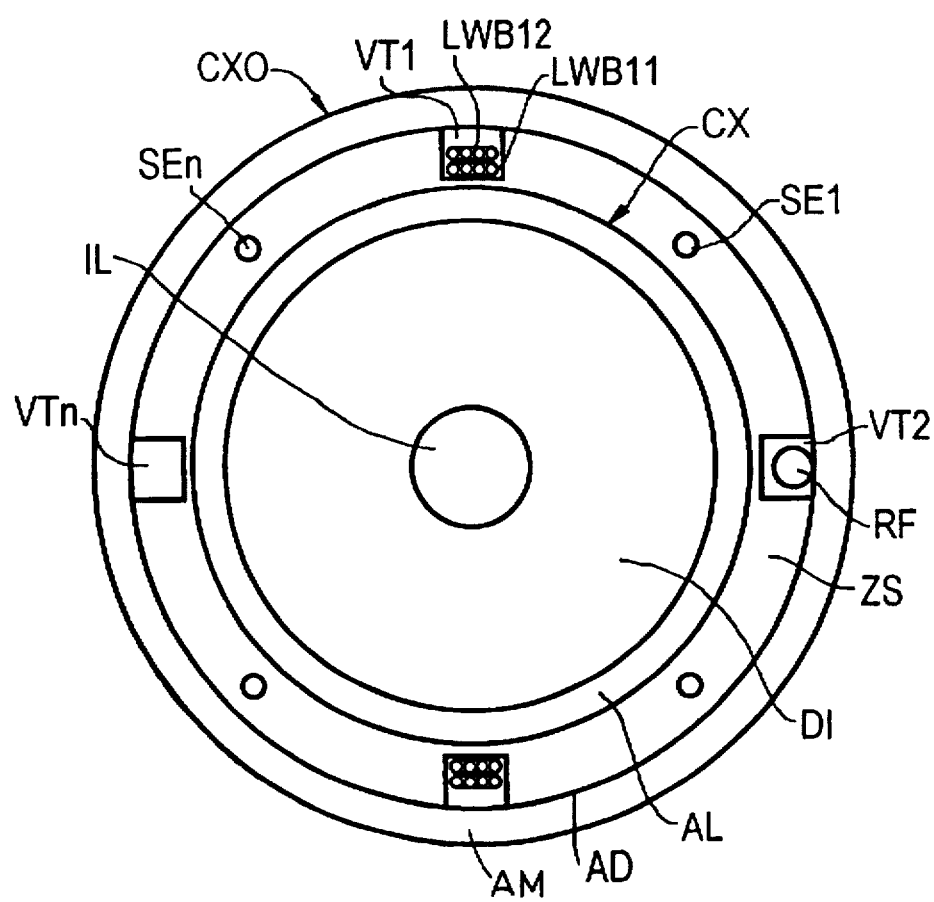
FIG. 1 is a front view of a first exemplary embodiment of a cable of the invention.

FIG. 1 shows a schematic front view of the structure of a cable of the invention. The inner conductor of a coaxial cable CX is referenced IL in FIG. 1 and can be formed in a known way of a single wire, of a plurality of stranded wires, of a conduit or the like. It is preferable when tensile materials are employed for the inner conductor, in particular, for example, steel wires that may be potentially provided with a correspondingly more conductive layer at the outside, such as copper-plating or silver-plating. In this case, the inner conductor can also simultaneously serve as a strain element or a tensile element of the overall cable CXO.

The inner conductor IL is followed by a dielectric DI that can be constructed in the way standard in coaxial cables, i.e., for example, it can be composed of a solid plastic material having a correspondingly low loss factor. It is also possible to utilize foamed or cellular plastic materials here, or individual solid supporting rings of insulating material that are arranged at appropriate intervals from one another (viewed in an axial direction). For example, insulating strands helically wrapping the inner conductor or dielectrics with longitudinal bores, supporting weaves or the like can also be employed.

The dielectric is followed by the outer conductor AL of the coaxial cable. Known outer conductor materials and designs can likewise be employed for this, such as, for example, weaves, conduits, corrugated pipe, etc. It is expedient when the elements IL, DI and AL, i.e. the actual coaxial cable CX, are designed resistant to transverse pressure. It is thereby especially advantageous when designs resistant to transverse pressure are employed for the outer conductor AL. As warranted, the outer conductor AL can also be designed multi-layer fashion and/or comprise a highly conductive coating at its inside.

An intermediate layer ZS that comprises channel-shaped or chamber-shaped depressions VT1–VTn accessible from the outside is arranged on the outer conductor. The intermediate layer ZS is preferably applied onto the outer conductor AL in an extrusion process. However, it is also possible to wrap the intermediate layer around the outer conductor in the form of a channeled band, or to helically coil it thereon, whereby a joint (not shown here) arises at the end face. The thickness of the preferably compression-proof intermediate layer can be preferably selected between 0.5 and 5 mm, and preferably between 1 mm and 3 mm. This depends on how deep the depressions VT1–VTn respectively accessible from the outside are designed. The numerical distribution of these depressions VT1–VTn depends on how many light waveguides are to be accommodated. Preferably, at least one light waveguide is arranged in each depression as an optical transmission element. However, it is also possible to not provide individual depressions with light waveguides and to employ the clearance arising in this way for a lead pair of electrical conductors and/or for monitoring gas pressure or the like. In the present example, respective ribbon conductors LWB11 and LWB12 are provided as light waveguides, these being introduced in pairs into the corresponding depressions. However, it is also possible to provide single light waveguides. It can also be expedient to close the depressions longitudinally in watertight fashion with a filling compound after the introduction of the light waveguides, or to employ a swelling powder.

Reinforcing elements and/or supporting elements SE1 through Sen can be introduced into the intermediate element for enhancing the tensile strength and, potentially, the resistance to crushing. These are preferably arranged roughly in the middle between the individual depressions VT1–VTn. It is also possible to introduce a plurality of such tensile and/or supporting elements between individual depressions VT1 and VT2. Finally, it is also possible to manufacture the intermediate member ZS of a high tensile strength material as a whole, particularly, for example, of a liquid crystal polymer (LCP).

The individual depressions VT1–VTn run helically around the cable axis that lies in the middle of the inner conductor IL. The insertion of the light waveguides LWB11, LWB12, etc., is especially simple because the chamber-shaped, particularly rectangular depressions VT1–VTn are outwardly open. After the insertion, these depressions VT1 through VTn are closed, for example by a film AD or the like that is wrapped thereover, or wound around the intermediate layer ZS. Subsequently, a single-layer or multi-layer outside envelope AM is applied, especially by extrusion, and the finished, combined electrical and optical cable CXO arises.

Tear threads that allow the outside envelope AM to be slit open at appropriate places in the longitudinal direction can also be introduced in the region of the intermediate layer in which the reinforcing elements SE1–SEn lie. Just like the corresponding tensile or supporting elements SE1–SEn, these tear threads run helically around the cable axis. Tear threads can also be placed into one or more of the depressions.

In order to achieve higher tensile strength, a tensile auxiliary layer can also be provided between the outer conductor AL and the intermediate layer ZS, and/or between the intermediate layer ZS and the outside envelope AM. For example, this auxiliary layer can be designed as a ply or layer of high tensile strength material, for example of aramid yarn or in the form of an armoring of metal wires or of a corrugated piping, etc. Finally, the illustrated cable can also be provided with its own, externally applied carrying element, for example in the fashion of an 8-shaped cable. A tensile rope, for example, is also co-extruded on the envelope Am, this serving as a suspension means for the cable CXO.

Coaxial cable and light waveguide cables as well represent relatively sensitive structures, so that changes in the transmission properties can occur given great stresses, especially in the radial direction (compressive strains). The invention is also based on the object of disclosing a way to improve the protection of such a combined coaxial and optical cable. In a coaxial cable of the type initially cited, this is achieved in that a protective pipe surrounding this cable structure is additionally provided at the outside. This protective pipe forms a receptacle both for the coaxial cable as well as for the optical cable and assures that the transmission properties are retained largely unaltered even given, for example, radially attacking forces.

Figure 2:
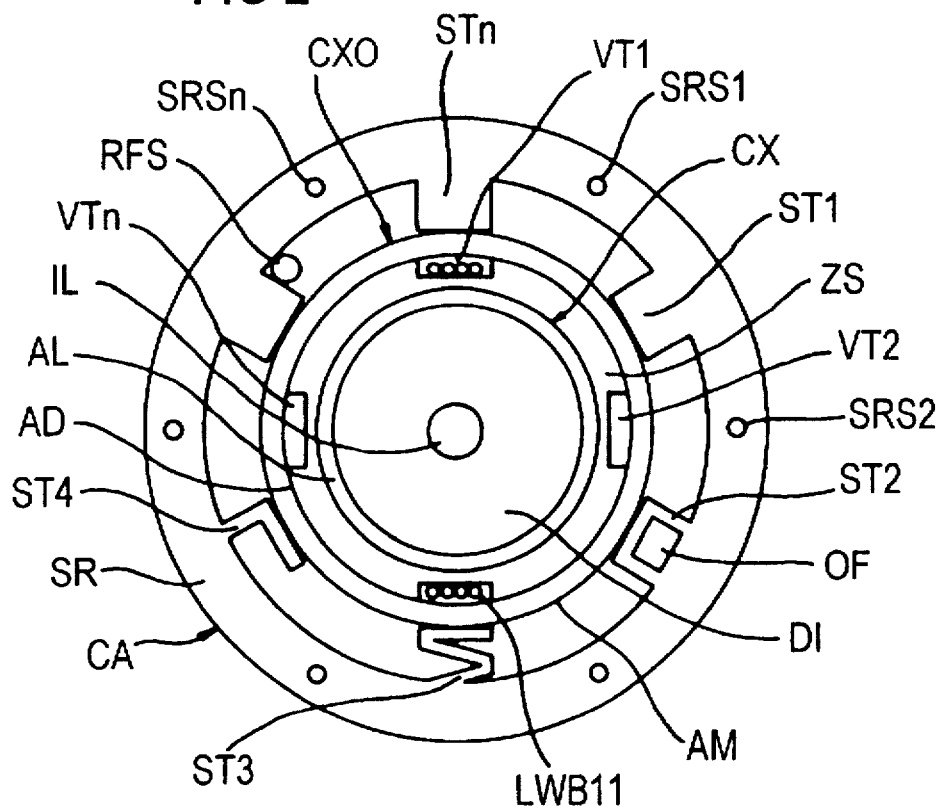
FIG. 2 is a front view of a second exemplary embodiment of a cable of the invention.

Analogous to FIG. 1, the coaxial cable CX in FIG. 2 contains an inner conductor IL, a dielectric DI and an outer conductor AL. An intermediate layer ZS that comprises a plurality of channel-shaped depressions VT1 through VTn is applied outside the outer conductor and preferably directly thereon. These depressions proceed helically in the longitudinal axis of the cable and are envisioned for the acceptance of light waveguides. In the present example, light waveguide ribbons LWB11 are assumed as light waveguides.

It is also possible to provide further connecting layers, for example in the form of tensile elements or the like, between the outer conductor AL and the intermediate layer ZS.

The depressions VT1 through VTn are closed by a covering AD, preferably in the form of a film, in order to prevent the light waveguides or other elements from falling out. A single-layer or multi-layer envelope AM terminates the structure formed in this way and thus forms a hybrid cable in the form of a cable structure CXO that is suitable both for the transmission of electrical as well as for the transmission of optical signals.

Since the intermediate layer ZS is preferably designed as thin as possible (preferably about 0.5 to 5 mm) and the dielectric DI of the coaxial cable CX often likewise has little resistance to transverse pressure, a considerable deformation of the cable structure CXO can occur given the application of radial forces (for example, given a cable laid in the ground). In order to prevent this, a protective pipe SR in which the cable structure is arranged, preferably movably or loosely, is provided at the outside. This protective pipe is preferably composed of extruded material and has an appropriate hardness, i.e. adequate resistance to transverse pressure (for example HDPE).

It is advantageous to additionally provide spacer elements between the actual protective pipe SR and the cable structure CXO. In the present example, these are designed as approximately radially proceeding webs ST1 through STn and are preferably manufactured of one piece with the protective pipe SR. These web-shaped spacer elements likewise preferably proceed helically with reference to the cable axis, whereby it is advantageous to select the direction of lay of the spacer elements opposite the direction of lay of the likewise helically proceeding depressions VT1 through VTn in the intermediate layer ZS. What is thereby assured is that the spacer elements ST1 through STn on the one hand and the depressions VT1 through VTn on the other hand only cross and the spacer elements are prevented from being pressed into the depressions VT1 through VTn. The protective pipe should have a wall thickness between about 2 and 5 mm, and the radial extent, i.e. the spacing produced by the interposed spacer or support elements ST1 through STn, is preferably selected between 1 and 3 mm. The interspaces arising due to the spacer elements are preferably filled with air; however, known filling compounds for producing longitudinal water tightness of cables can also be filled in.

The structure CXO is preferably loosely arranged, or arranged still slightly movable in the inside of the protective pipe SR. In order to avoid problems when winding onto drums, the structure CXO should be centrally arranged in the protective pipe SR. It can be preferably for this purpose to design the spacing elements to be resilient and/or yielding in order, despite the defined central position of the structure CXO, to avoid a transmission of transverse pressure forces onto it to the greatest extent. For example, the spacer elements can thus be designed as easily compressed, thin wall tubes such as indicated, for example, by the opening OF at the web ST2. Other embodiments, however, are conceivable such as, for example, accordion-like embodiments as in the case of ST3 or thin lamellae that are potentially designed angled-off fashion as in the case of ST4 in order to broaden the seating surface for the structure CXO.

The manufacture of the cable CA shown in FIG. 2 can also occur in one working cycle, i.e. the protective pipe SR together with its spacer webs ST1 through STn is subsequently extruded immediately after the application of the outside envelope AM of the cable structure CXO.

The tensile strength and/or resistance to transverse pressure of the cable CA is advantageously essentially assured by the outer protective pipe SR by itself, for which purpose, for example, this is provided with tensile and/or supporting elements SRS1 through SRSn that can, for example, be composed of steel wires, GFK (also known as FRP-fiber reinforced plastic) bars or rods, aramid yarns or the like and are advantageously firmly embedded into the protective pipe SR. The structure CXO is preferably designed so lightweight that it is not adequately stable by itself, particularly lacking adequate tensile strength and/or compressive strength in order to be independently laid as a cable in, for example, the ground. In the simplest case, the structure CXO is designed just barely such that the electrical and optical transmission properties are assured, but not the mechanical strength properties as required of a cable. In this case, the structure CXO only represents an intermediate product in cable fabrication and not a mechanically completely finished cable. As a trade-off, the structure CXO is very flexible, inexpensive and simple. It is only the overall structure of CA and SR that represents a finished cable.

One or more tear threads RFS can be advantageously provided in the inside region of the protective pipe SR.

Figure 3:
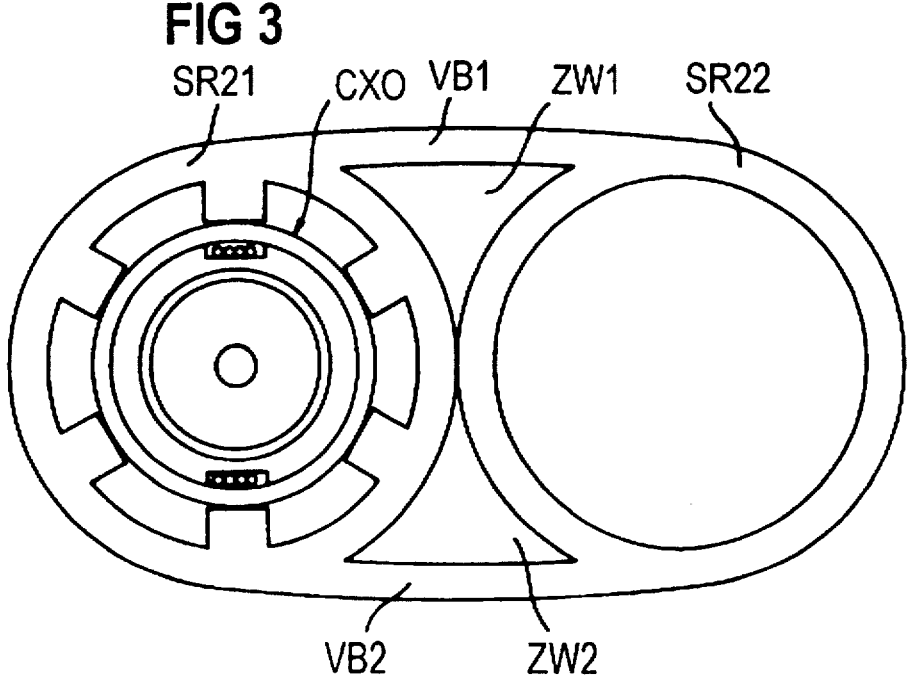
FIG. 3 is a front view of a further exemplary embodiment of the invention with an additional empty conduit.

A cable structure CXO corresponding to FIG. 2 is provided in the exemplary embodiment of FIG. 3, a protective pipe SR21 having a structure similar to FIG. 2 being arranged thereon. A second protective pipe SR22 that is advantageously also composed of plastic material and is connected to the protective pipe SR21 via connecting webs VB1 and VB2 is then additionally applied onto this protective pipe SR21. Gores ZW1 and ZW2 arising therebetween are advantageously filled with air; however, it is also possible, for example, to arrange tensile elements in these interspaces that entirely or partially fill these gores. For example, the interior of the second protective pipe can be employed for subsequently inserting other, preferably optical transmission elements, such as light waveguides therein, particularly by blowing these in preferably when the cable has already been laid.

FIG. 4 shows an embodiment of an 8-shaped cable CA3, whereby a hybrid cable CXO is accommodated in the inside of an outside envelope SR3 approximately comprising the shape of an eight. This outside envelope SR3 forms two inside spaces IR31 and IR32, whereby the hybrid cable CXO is accommodated in the inside space IR31. In the present example, an exactly defined position of the hybrid cable CXO by spacing spacers analogous to FIG. 2 and FIG. 3 has been foregone; rather, the hybrid cable CXO lies loosely with appropriate play in the inside of the larger interior space envelope IR31. A preferably smaller interior space envelope IR32 is provided thereover within the figure-8 configuration into which, for example, light waveguides or other transmission elements can be subsequently introduced.

FIG. 5 shows a schematic illustration of how such an 8-shaped structure analogous to FIG. 4 can be secured to a carrier cable TS with continuous clips LA, so that an aerial cable arises. The clips LA engage at the preferably smaller protective pipe part SR31, whereby an adequate resistance to transverse pressure can be assured even given applied clips LA.

Although various minor changes and modifications might be proposed by those skilled in the art, it will be understood that our wish is to include within the claims of the patent warranted hereon all such changes and modifications as reasonably come within our contribution to the art.

We claim as our invention:

1. A coaxial cable, comprising:
   an inner conductor, a dielectric around the inner conductor, and an outer conductor on the dielectric surrounding the inner conductor;
   an intermediate layer provided on the outer conductor;
   at least one channel-shaped depression provided in the intermediate layer;
   the at least one channel-shaped depression proceeding helically with reference to a longitudinal axis of the coaxial cable, and the depression being outwardly open;
   at least one light waveguide arranged in the channel-shaped depression;
   the depression being closed by a film wrapping;
   an outside envelope being applied on an outside of the wrapping;
   a protective pipe surrounding the outside envelope at a spacing therefrom; and
   the protective pipe having spacer elements between the outer envelope and the protective pipe to provide said spacing, no light waveguides being provided between the protective pipe and the outside envelope so that no damage occurs to any light waveguides, and so that the spaced protective pipe isolates the at least one light waveguide in the at least one depression in the intermediate layer from external compressive forces exerted on the protective pipe.

2. The coaxial cable according to claim 1 wherein the channel-shaped depression contains a ribbon conductor formed of a plurality of said light waveguides.

3. The coaxial cable according to claim 2 wherein two ribbon conductors are provided on top of one another in said channel-shaped depression.

4. The coaxial cable according to claim 1 wherein the at least one channel-shaped depression comprises a plurality of said channel-shaped depressions uniformly distributed over a circumference of the intermediate layer.

5. The coaxial cable according to claim 1 wherein the intermediate layer comprises a plastic material.

6. The coaxial cable according to claim 1 wherein the intermediate layer is selfbearing.

7. The coaxial cable according to claim 1 wherein the outer conductor is sufficiently stiff to resist transverse pressure.

8. The coaxial cable according to claim 7 wherein the outer conductor is a pipe.

9. The coaxial cable according to claim 1 wherein the dielectric between the inner conductor and outer conductor is sufficiently stiff to support the outer conductor.

10. The coaxial cable according to claim 1 wherein the spacer elements comprise webs.

11. The coaxial cable according to claim 1 wherein the spacer elements proceed helically with respect to said longitudinal axis.

12. The coaxial cable according to claim 11 wherein the at least one channel-shaped depression comprises a plurality of said channel-shaped depressions each having a helical path relative to said longitudinal axis of the coaxial cable and wherein the helically proceeding spacer elements are opposite the helical paths of the depressions.

13. The coaxial cable according to claim 1 wherein an additional protective pipe is structurally connected to the protective pipe surrounding the outside envelope.

14. The coaxial cable according to claim 13 wherein the additional protective pipe has an inside space which is open for acceptance of further transmission elements.

15. The coaxial cable according to claim 14 wherein the further transmission elements comprise said light waveguides.

16. The coaxial cable according to claim 14 wherein the inside space of the additional protective pipe is smaller than an inside space of the protective pipe which accepts the outside envelope.

17. The coaxial cable according to claim 16 wherein the protective pipe and the additional protective pipe as connected together have a shape of a figure 8 in cross-section.

18. The coaxial cable according to claim 17 wherein a carrier cable is secured to the additional protective pipe.

19. A coaxial cable, comprising:
   an inner conductor, a dielectric around the inner conductor, and an outer conductor on the dielectric surrounding the inner conductor;
   an intermediate layer provided around the outer conductor;
   at least one depression provided in the intermediate layer extending at least partially in a direction of a longitudinal extent of the coaxial cable, said depression proceeding helically with reference to a longitudinal axis of the coaxial cable, and the depression being outwardly open;
   at least one light waveguide arranged in the depression;

the depression being closed by a wrapping;

an outside envelope around the intermediate layer and being applied on the wrapping over the depression;

a protective pipe surrounding the outside envelope; and the protective pipe having spacer elements between the outside envelope and the protective pipe to provide a spacing, no light waveguides being provided between the protective pipe and the outside envelope so that no damage occurs to said light waveguides, and so that the protective pipe isolates the at least one light waveguide in the at least one depression in the intermediate layer from external compressive forces exerted on the protective pipe.

* * * * *